(12) United States Patent
Hattersley et al.

(10) Patent No.: US 7,357,326 B2
(45) Date of Patent: *Apr. 15, 2008

(54) FLUORESCENT OR LUMINESCENT OPTICAL SYMBOL SCANNER

(75) Inventors: John R. Hattersley, Skaneateles, NY (US); Francis O. Blackwell, III, Auburn, NY (US)

(73) Assignee: Industrial Data Entry Automation Systems Incorporated, Skaneateles, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/290,762

(22) Filed: Nov. 30, 2005

(65) Prior Publication Data

US 2007/0119949 A1 May 31, 2007

(51) Int. Cl.
*G06K 7/10* (2006.01)
(52) U.S. Cl. ............................. 235/462.45; 235/472.01
(58) Field of Classification Search ................ 235/468, 235/462.42–462.45, 462.47, 462.11, 462.05, 235/454, 491, 472.01, 462, 472
See application file for complete search history.

(56) References Cited

U.S. PATENT DOCUMENTS

| 5,107,445 | A | * | 4/1992 | Jensen et al. ............... 374/161 |
| 5,502,304 | A | * | 3/1996 | Berson et al. .............. 235/468 |
| 5,525,798 | A | * | 6/1996 | Berson et al. .............. 235/468 |
| 6,352,204 | B2 | * | 3/2002 | Hattersley et al. ..... 235/472.01 |
| 6,824,061 | B1 | * | 11/2004 | Hattersley et al. ..... 235/472.01 |
| 2003/0062413 | A1 | * | 4/2003 | Gardiner et al. ............ 235/454 |
| 2003/0080193 | A1 | * | 5/2003 | Ryan et al. ................. 235/491 |

* cited by examiner

*Primary Examiner*—Daniel Stcyr
(74) *Attorney, Agent, or Firm*—Bernhard P. Molldrem, Jr.

(57) ABSTRACT

A hand-held, compact fixed mounted or mobile optical symbol scanner assembly that employs black-light emitting diodes to illuminate luminescent or fluorescent bar code symbols that are invisibly printed or formed the surface of an article. The scanner employs an array of far blue or UV LEDs or laser diodes. An optional nosepiece or shroud on the distal face of the scanner device limits glare from ambient light and also protects against stray UV light. A filter disposed in advance of the imager device blocks the illuminating wavelength but transmits the luminescent light from the target. With proper selection of optical filters and illumination LED wavelengths, the scanner can be used with inks or dyes that fluoresce when exposed to light in the visible spectrum.

19 Claims, 4 Drawing Sheets

FLUORESCENT OR LUMINESCENT OPTICAL SYMBOL SCANNER

BACKGROUND OF THE INVENTION

This invention is directed to optical scanning devices, such as bar code scanners, and is more particularly concerned with an arrangement for reading optical symbols, e.g., small linear or two-dimensional bar code symbols that are directly marked on articles. The invention is more particularly concerned with a combination of a hand-held optical scanner and an illuminator that provides stimulating illumination onto a bar code symbol or other symbol which is formed of a fluorescent or phosphorescent or luminescent material. This scanner may be of a corded or cordless variety or built into a data terminal or be of a compact, fixed mount style.

Within the past several years, two-dimensional bar code systems have begun to be employed on small articles so that the article can be tracked throughout manufacturing, packaging, and shipping. In some cases, luminescent or fluorescent bar code symbols are invisibly printed onto articles, e.g., onto the base or bottom of a pharmaceutical vial to identify the contents, as well as to provide information about the batch number, date and place of manufacture. Where 2-D symbols are used, these can carry all the required information within a square that may typically be only three to six millimeters on a side. The symbols can be thermally transferred, screen printed or ink-jet printed directly onto the surface of the pharmaceutical vial or other article. At present, machine-mounted camera-based scanner systems are employed, in which the articles proceed past the scanner station, and the articles receive illumination from a discharge-tube type black light source. These scanner systems are bulky and non-portable, so they cannot be carried by an operator. This makes it impossible to read the bar codes in a warehouse, shipping dock or receiving dock environment where the workers could be provided with hand-held scanners. In addition, because of the rather harmful effects from ultraviolet radiation, conventional black light sources typically have to be shielded to protect the workers from exposure to skin or eyes. Consequently, invisibly printed phosphorescent bar code symbols can only be read under special circumstances, as the bulk, weight, and complexity of the reader equipment has limited their widespread usage.

Recently, short-wavelength light emitting diodes (LEDs) have been introduced. Such LEDs can emit light in the deep blue to near UV region of the spectrum, and can be used to produce black-light illumination. These have been used notably, in combination with an encapsulation of luminescent phosphors, to create so-called white LEDs, in which the short-wavelength light stimulates the phosphors to create a blend of red, green, and blue light. No one previously had considered using black-light emitting diodes in connection with any sort of hand-held scanner device to permit their use in reading "invisible" luminescent or fluorescent optical symbols, such as bar codes.

One previous attempt to incorporate an ultraviolet source into a hand held scanner is discussed in Feng U.S. Pat. No. 6,123,263. That patent deals with a reader that employ discharge tubes or flash tubes with filter elements to cut out some of the UV, so that the emitted light falls in a narrow band of 300 to 400 nm. That device has to strobe continuously, i.e., several times per second, with very high intensity illumination. That patent does not discuss any safety issues, and does not attempt to eliminate or minimize the effects of stray UV illumination.

More recently, the same inventors involved here have produced a scanner which employs black light LEDs for illumination in the blue-violet and near UV region for illuminating bar code symbols that are printed in phosphorescent, luminescent or fluorescent inks. This scanner is described in U.S. Pat. No. 6,824,061, Nov. 30, 2004. The scanner had employed a hollow nosepiece with an opaque shell that concentrates the illumination on the fluorescent target and also helps shield the operator from stray short-wavelength illumination. The nosepiece also keeps ambient light from flooding the imager within the scanner.

Quite recently, fluorescent or luminescent inks have been developed that can be stimulated at visible wavelengths and will produce light at a slightly longer visible wavelength. Other possible inks respond to visible light with fluorescence in the IR region. However, prior hand held scanners are unable to discern bar coded symbols formed of these fluorescent inks, because of the low contrast between the target and background.

OBJECTS AND SUMMARY OF THE INVENTION

Accordingly, it is an object of this invention to provide an improved hand-held optical symbol scanner that avoids the drawbacks of the prior art.

It is another object to provide a hand-held scanner that is safe and convenient to use for reading invisibly printed fluorescent optical symbols.

It is a further object to provide a hand-held scanner and illuminator that permits a user to read and accurately decode a fluorescent or luminescent symbol that has been directly printed on an article and which scanner employs one or more low-power far-blue, UV/blue, UV or similar black-light source, or, in some cases, a visible light source, contained within an illuminator portion of the hand-held scanner.

It is a similar object to provide a hand-held scanner and illuminator that permits the user to read and decode a symbol printed with an ink that is stimulated at one visible wavelength, e.g., in the green to orange region, and responds by emitting light at a slightly longer wavelength, e.g., in the orange to red region, or which may emit even longer wavelengths, e.g., in the infrared region.

It is still a further object to provide an illuminator that fits on or mounts onto the distal or front of an available hand-held 2-D bar code scanner, so that the scanner can be used in a variety of factory, warehouse, shipping, or retail (e.g., pharmacy) environments.

It is a more specific object that a black-light illuminator (or visible-light illuminator) be incorporated into the working or distal face of the scanner so that the scanner will pick up the invisible bar code symbol as a pattern of bright and dark regions.

According to one aspect of this invention, a scanner assembly is configured for detecting and decoding a small scale two dimensional optical symbol, such as a 2-D bar code symbol, lying on a surface of an article. The scanner or optics assembly can be based on, or incorporated into a portable (hand-held) contact device, and can be easily adapted for wireless battery-powered operation.

The optical symbol scanner assembly here is adapted for detecting and decoding any of a variety of bar code symbols or other visible symbols that lies on the surface of an article, with the symbol comprising a pattern of luminescent and non-luminescent areas that can identify lot number and origin of an item. This scanner assembly can be used to advantage in the pharmaceutical, automotive, and other industries, in connection with pharmaceutical vials, security-marked items, consumer product sub-assemblies, and many other types of items. In some embodiments, the optical symbol scanner assembly is adapted for detecting and decoding a phosphorescent or luminescent symbol, i.e., a pattern of fluorescent markings on a non-fluorescent surface, in which the fluorescent markings glow or fluoresce in the presence of black light radiation. In other embodiments, visible light is used for bar coded symbols or other targets that are printed with phosphorescent materials that luminesce in the presence of longer wavelength (e.g., visible) illumination.

The hand-held, portable or compact, fixed mount scanner device has a housing, with a distal face and light-generating means on the distal face of the housing. This light-generating means produces the black-light or visible stimulation illumination and directs it to fall on the luminescent or fluorescent symbol. The light generating means includes at least one light-emitting diode, which may be a black-light emitting diode, and preferably an array of such diodes. A focusing lens group is positioned on the optic axis of the scanner for focusing an image of the symbol onto a solid-state imager device positioned proximally of the lens group within the scanner device. A filter in line with the focusing lens group transmits the light emitted by the luminescent symbol, but blocks the light with the wavelength of the stimulating illumination, i.e., that of the LEDs. The filter preferably has a sharp cutoff between the two wavelengths. In a preferred embodiment, an array of LEDs may be mounted at the distal face of the scanner housing and the LEDs are spaced left and right of the optic axis. The LEDs are held on for the time necessary to obtain a good read of the optical symbol, and are not "strobed." This permits the imager to be electronically "shuttered" to obtain the proper exposure of the various pixels of the imager to obtain an adequate video signal that can be decoded.

A nosepiece, i.e., a shield or shroud, may be mounted on the distal face of the scanner device, and has an optical passageway whose optic axis is aligned with the optic axis of the scanning device. An illumination channel within the shield conducts the illumination, that is, directs and guides the black light emitted by the diodes, so that black light illumination impinges on the symbol and the scanner device views an image of the symbol as produced by its fluorescent markings. The optional shield or shroud may be hollow or not, but should define pathways that are optically clear for the wavelengths that need to travel on those pathways.

The nosepiece may preferably be in the form of a hollow shroud, and may include at its distal end a dust window of a material that is transparent to black light illumination. The window can be a transparent plate that is tilted, i.e., oriented at a non-right angle, with respect to the optic axis.

The nosepiece or shield can be formed of a plastic or metal material, and may be provided with an opaque coating.

Black-light producing LEDs may preferably be of the type that produce illumination in the far blue to near ultraviolet region, i.e., between 350 nm and 420 nm.

The optical filter interposed along the scanner's optical axis in advance of the imager device may be a yellow or orange filter or a UV blocking material for passing light that fluoresces from the markings, but blocking the black light from the diodes so that the illumination does not flood and blind the imager. The need for the optical filter depends on the wavelength and intensity of the fluorescing inks used.

In some preferred embodiments of this invention, the bar code symbols emit visible, i.e., white, red or blue light when stimulated by the far blue or UV radiation, and the imager device in the scanner is configured to respond to visible light images. However, the invention is not limited only to these embodiments, and it is possible for scanners of this invention to be employed with bar code symbols that emit other wavelengths when illuminated.

Some available diodes can have a principal wavelength of 370, 390, or 405 nm, e.g., and 405 nm is preferred as it does emit an amount of blue light that is sufficiently visible to indicate when the device is ON. These devices all emit what is generally referred to as black light illumination, that is, wavelengths sufficiently short (energetic) so as to stimulate the fluorescent materials used in printing the bar coded symbols to produce visible light that can be picked up by the imager in the scanner. The stimulating light can be in the blue (or violet) end of the visible spectrum or beyond it in the UV region. The stimulating light may be of even longer wavelengths, e.g., in the green or orange parts of the visible spectrum, provided that it stimulates a fluorescent die or ink to emit light in response at another wavelength.

In order to accommodate black-light diodes, the power circuitry within the scanner may have to be modified slightly. While the usual red and IR LEDs that are conventionally used have a forward voltage of about 1.8 volts, the blue and UV LEDs used in embodiments of this invention require a forward voltage of about 3.6 volts. This means that where the conventional scanner has its red or IR LEDs connected in series, the scanner with the black light diodes will have to place the diodes in parallel or use a switching power circuit to allow multiple LEDs to be powered in a series-parallel format from the single power source. It may use a further series dropping resistance so that the illuminator can operate in the same environment and produce the required black light illumination. For LEDs that emit light elsewhere in the visible spectrum, the LED drive circuitry should provide the appropriate voltage.

The optional nosepiece is preferably in the shape of a truncated pyramid, i.e., frustum of a pyramid, and may be formed conveniently of a plastic or metal sheet, and may be coated or covered with a black (opaque) coating material. Other opaque materials may be used. A suitable warning label may be placed on a top surface of the nosepiece to warn the user against potential injury from the radiation.

With proper filtration, and careful selection of wavelengths and inks or dies, it is possible in many cases to omit the nosepiece, or to modify it. In a preferred visible-light to visible-light fluorescent system, the hand-held scanner has light-emitting diodes position on its distal face for producing illumination at a first wavelength (e.g., a center wavelength of 680 nm) to fall on the bar coded symbol, which then emits radiation at a second wavelength (e.g., 720 nm). A focusing lens group focuses an image of the symbol on the imager device within the scanner. An optical filter in line with said focusing system admits light at the second wavelength and blocks the illumination at said first wavelength. An optional second optical filter (or filters) positioned in line with the LEDs may transmit light at first wavelength but block the illumination at said second wavelength. The shield may optionally be mounted on the distal face of said scanner device, to define an optical passageway and illumination channel.

The above and many other objects, features, and advantages of this invention will present themselves to persons skilled in this art from the ensuing description of preferred embodiments of this invention, as described with reference to the accompanying Drawing.

DETAILED DESCRIPTION OF THE PREFERRED EMBODIMENT(S)

Figure 1:
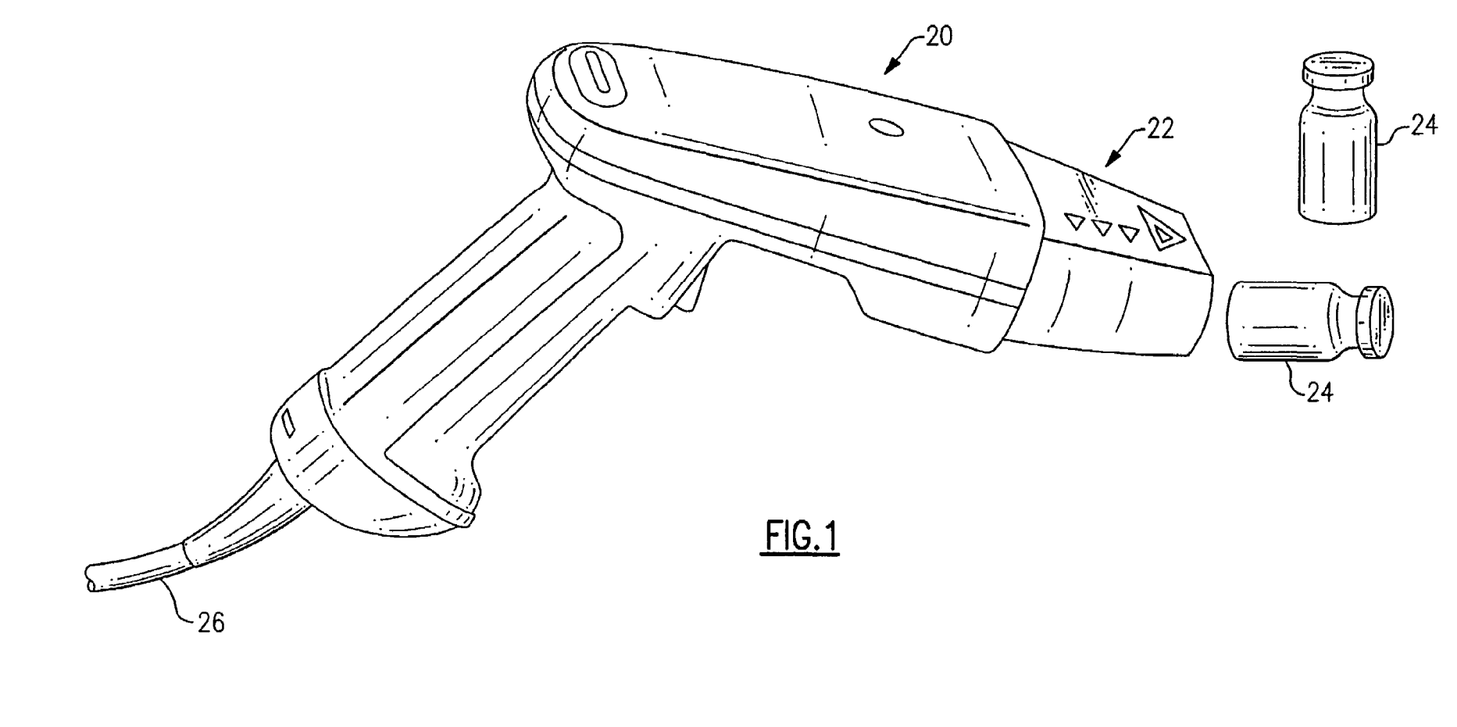
FIG. 1 is a perspective view of a bar code scanner with a black-light (or selected wavelength visible light) illuminator, according to an embodiment of this invention.

With reference to the Drawing, and initially to FIG. 1, a hand-held data inputting scanner 20, i.e., a hand-held two dimensional bar code scanner, includes an illumination attachment which incorporates a nosepiece 22, with the nosepiece being mounted on the front or distal end of the body of the scanner 20. This scanner employs black-light illumination and is designed to read a bar code symbol that is invisibly printed on a surface, here on the base of a vial 24 of the type used for containing medication. The bar code symbol may be linear, 2-D or 3-D, and is intended here to identify the contents of the vial 24, including the type of pharmaceutical, place of manufacture, date, and batch number, plus other required information. This information is initially used for automated processing in factory, and is typically read in an automated device in which black light, i.e., ultraviolet, is provided from a discharge tube to illuminate the bottoms of the vials as they pass by on a production line. The bulkiness and non-portability of the equipment has made it impractical to employ it in other environments. Here, the hand-held scanner 20 permits a user in a warehouse, shipping location, or at a customer location to check the contents of the vials on an individual basis by reading the fluorescent bar coded symbols.

The scanner assembly can be a near-contact device, in which the tip of the nosepiece 22 is positioned either in contact with the bottom of the vial 24 or within a few centimeters or more of it. The scanner device has a distal face on which is positioned light generating means, e.g., an array of LEDs, for producing illumination to fall on the symbol, and focusing means to focus an image of said symbol on an imager device positioned proximally of the focusing means in said scanner device. Various known coding can be used for the symbols. At the base of the handle of the scanner is a coiled cord 26, which can connect to a computer, or interface to a wireless device. A radio and battery may be internal to the scanner and the scanner optics may be attached to a self-contained portable data terminal.

Figure 2:
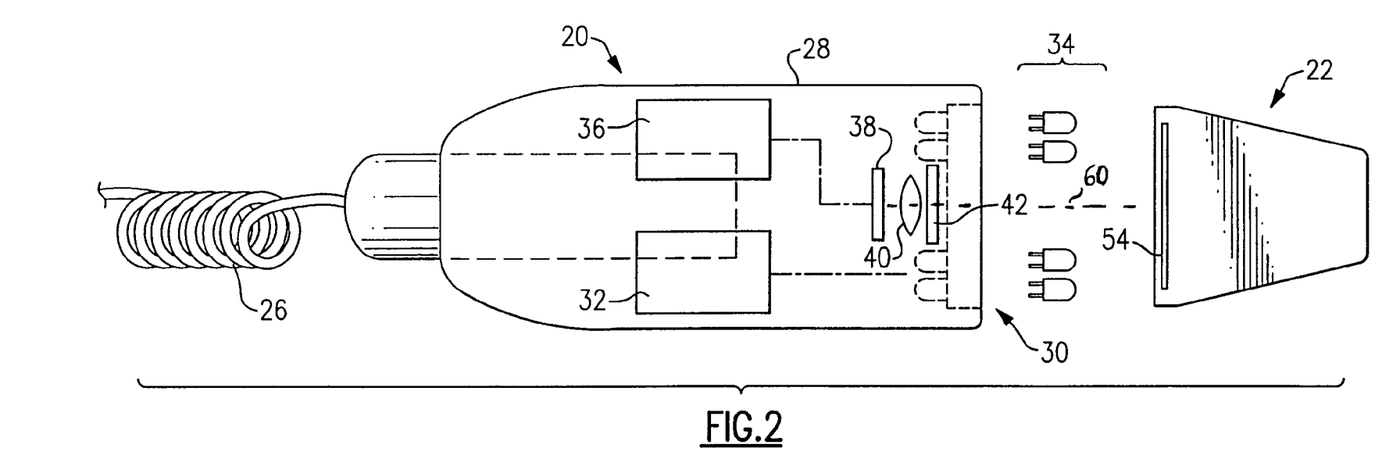
FIG. 2 is a top exploded view of the scanner of this embodiment.

As shown in FIG. 2, the scanner 20 comprises a housing or shell 28, with a front or distal end 30. An internal circuit board 32 provides power to an array of power illumination diodes 34, (LEDs) which here provide far blue and/or near ultra-violet wavelengths, e.g., with a center wavelength of 405 nm. A second internal circuit board 36 is associated with a solid-state imager 38, such as a CCD device. A focusing lens or lens group 40 defines an optic axis 60 for the scanner, and focuses the image of the symbol onto the imager device 38. An optical filter 42 is situated along optic axis 60 in advance of the imager 38, in this embodiment between the lens 40 and the imager 38. As mentioned before, this filter 42 is designed to pass the longer visible wavelengths, and suppress the wavelengths of the diodes 34 so that the illumination from them does not flood and blind the imager. This can be generally a yellow or orange filter, but may depend on the wavelength and intensity of the LEDs and the fluorescing inks. The LEDs 34 are positioned on the distal end 30, with several of each on either side of the optic axis 60.

The LEDs 34 are diodes that emit in the far blue to near ultraviolet region of the electromagnetic spectrum, which can be wavelengths between about 350 nm to about 430 nm. Available diodes can have a principle wavelength of 370, 390, or 405 nm, e.g., and 405 nm is preferred as it does also emit an amount of blue light that is sufficiently visible to indicate when the device is ON. These diodes emit what is generally referred to as black-light illumination, that is, wavelengths sufficiently short (energetic) so as to stimulate the fluorescent materials used in printing the bar coded symbols to produce visible light that can be picked up by the imager in the scanner. The stimulating light can be in the blue (or violet) end of the visible spectrum or beyond it in the UV region. Depending on the fluorescent material used, the stimulating light may also be within the visible spectrum, and may even be in the green to orange regions.

In order to accommodate the black-light diodes 34, the power circuitry within the circuit board 32 has to be modified slightly. Whereas the usual red and IR LEDs that are conventionally used in this type of scanner have a forward voltage of about 1.8 volts, the blue and UV LEDs used in embodiments this invention require a forward voltage of about 3.6 volts. This means that where the conventional scanner has its red or IR LEDs connected in series, the scanner with the black light diodes (or other shorter wavelength diodes) will have the diodes wired in parallel, or use a switching power circuit to allow the multiple LEDs to be powered in a series-parallel format from the single power source. It may use a further series dropping resistance so that the illuminator can operate in the same environment and produce the stimulating wavelengths required for the fluorescent material.

The optional nosepiece 22 is in the form of a hollow shield or shroud, i.e., a hollow member that contains and directs the black light radiation so that if reaches only the intended zone, i.e., the target or symbol. The nosepiece is mounted on the distal face of said scanner device, and forms an optical passageway with an optic axis aligned with the optic axis of said scanning device.

Figure 3:
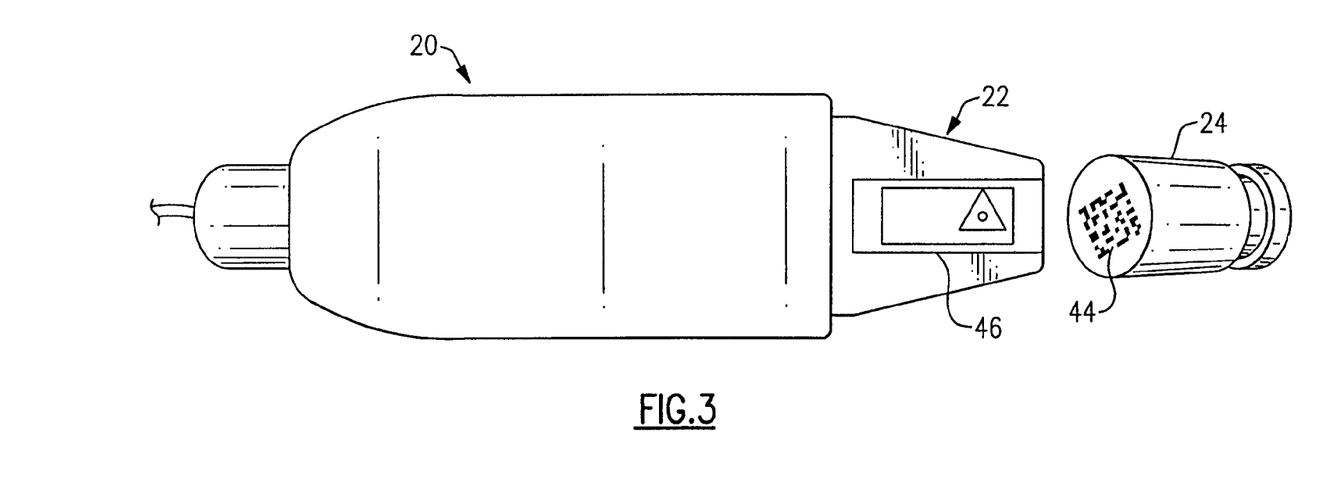
FIG. 3 is a top plan view of this embodiment, illustrating its use with a pharmaceutical vial having invisible bar coding thereon.

As shown in FIG. 3, the scanner 20 is employed by placing the nosepiece 22 very near or against the bottom of the vial 24, so that the 2-D bar coded symbol 44 will be visible through the distal end of the nosepiece. There the symbol 44 would normally not be visible, as it would appear as clear material on a transparent vial or white on a white vial. However, in the presence of stimulating UV or other black light, the phosphorescent ink will make the symbol 44 visible, generally as illustrated here. The nosepiece 22 is opaque to the black-light wavelengths, except out through its tip. A caution label 46 may be placed on one surface, e.g., on the upper surface, of the nosepiece, as shown, to warn the user to avoid direct exposure of the radiation to eyes or skin.

Figure 3A:
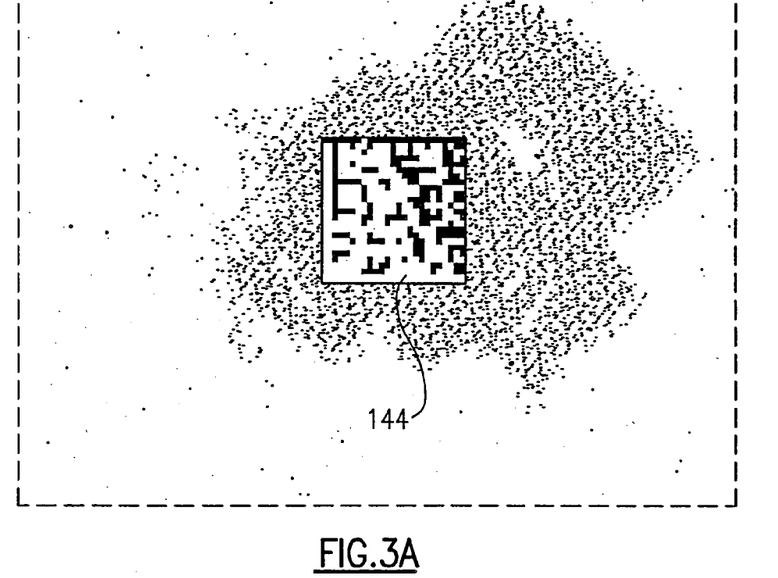
FIG. 3A is an illustration of the image of the two-dimensional symbol as picked up by the scanner of this embodiment.
Figure 4A:
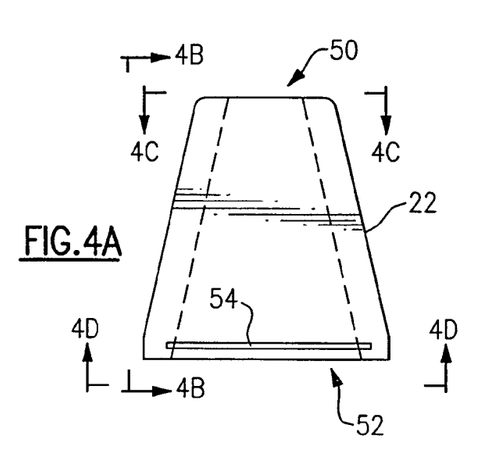
FIGS. 4A to 4D are a top view of the nosepiece of this embodiment, a side elevation, a front view and a back view, respectively, with FIG. 4B being taken along line 4B-4B, FIG. 4C taken along line 4C-4C, and FIG. 4D taken along line 4D-4D of FIG. 4A, respectively.
Figure 4B:
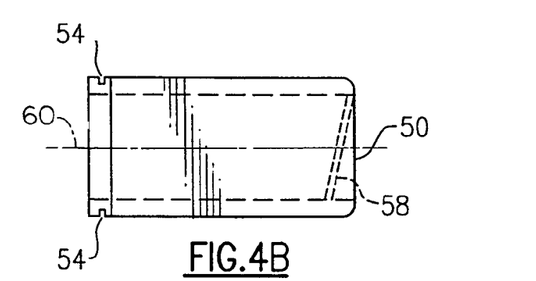
Figure 4C:
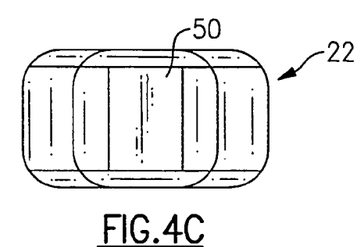
Figure 4D:
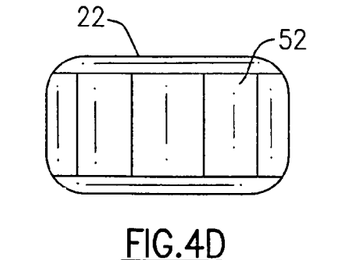

FIG. 3A shows a typical video image 144 of the label or symbol 44, as picked up and captured on the imager device 38. As illustrated here, the 2-D image 144 can be easily decoded using standard software, so the scanner black-light diodes do not need to be energized for more than a fraction of a second for each vial. However, the diodes are lit continuously for that period, and are not strobed, as would be the case for a discharge tube illumination device.

As shown in FIGS. 4A to 4D, the nosepiece 22 or shield can be formed as a truncated pyramid or pyramid frustum, from ¼-inch thickness acrylic sheet material, assembled so as to have a hollow interior, a window opening 50 at the narrow distal end and a wide opening 52 at the base or proximal end. There are lateral slots 54 in the top and bottom walls near the proximal end that mate with engaging ridges within a seating recess at the distal face 30 of the scanner. A thin glass plate 58 that serves as a dust barrier window is positioned at the distal window opening 50. This transparent plate 58 is transparent with respect to the black-light illumination and also to the visible light produced by the phosphorescent bar coded symbols. The window plate 58 is oriented at a tilt, i.e., non-right angle, with respect to the optic axis 60, so that illumination does not reflect directly back towards the lens 40 and imager 38. The nosepiece 22 of this embodiment is about two inches in length, one inch thick, and one-and-three-quarters inches wide at its proximal end. The distal window opening 50 is preferably about one-half inch by three-quarters inch, so that the 3-mm by 3-mm symbol 44, or any of a variety of larger or smaller symbols or somewhat larger ones, can be viewed through it. The actual dimensions of the window opening are not critical. The window opening 50 accommodates a field of view of 0.55 inches (14 mm) square. The plastic material is preferably coated with a black (opaque) material on the outside surface, although it is possible that the shroud can be made up of another opaque material. The shield or nosepiece 22 serves as a guide for the illumination so that when the target, i.e., symbol 44, is properly positioned at the tip or window opening 50, the target can be properly illuminated and scanned. The scanner 20 has a sensitivity adapted for use in ambient conditions from darkness up to 100 lux. The codes associated with the bar coded symbols can be Data Matrix, QR Code, Aztec Code, Code 39, Code 128, Codabar, I-2of5, UPC or other popular codes. The scanner 20 has a power requirement of only 4 to 14 volts DC, with a current draw (average) of approximately 200 to 300 mA.

In other embodiments, the shroud or nosepiece 22 could be of a different shape, or made with different materials, as suits the specific application.

Figure 5:
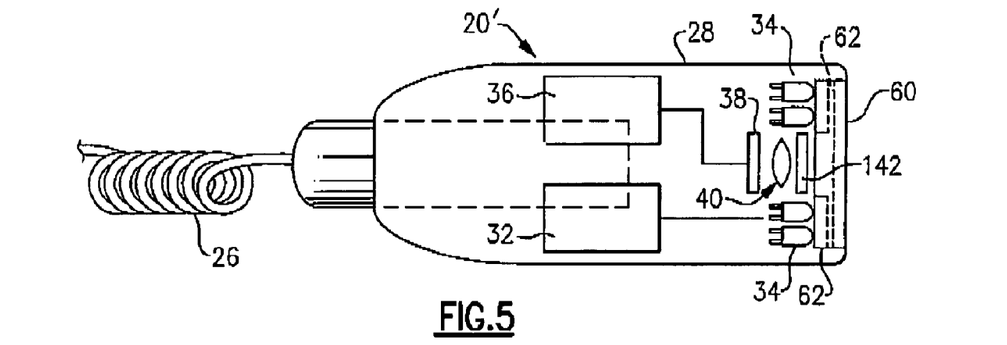
FIG. 5 is a top view of the scanner of another embodiment of the invention.

As shown in FIG. 5, a hand-held optical scanner 20' embodying this invention can be provided without the shroud or nosepiece of the embodiments described above. Elements that correspond to similar elements in the preceding embodiment are identified with similar reference numbers.

The hand held scanner 20' has an internal circuit board 32 that provides electrical power to the two groups of illuminating LEDs 34, which are here disposed to the left and right of the scanner's optic axis. The LEDs 34 are selected to provide light of an appropriate wavelength for stimulating the particular ink or dye used in the luminescent bar coded symbol or target. Accordingly, the circuit board 32 is constructed so as to provide the drive voltage as appropriate for such LEDs. The second internal circuit board 36 provides control signals to the solid-state imager 38, and processes video signals from the imager to decode the optical target or symbol. The circuit board 36 controls electronic shuttering of the various pixels in the imager, i.e., controls the exposure times during which electrical charge is collected representing the relative photon intensity of the image for each pixel. The first circuit board 32 provides a steady drive current for the exposure time, and does not strobe the LEDs 34. A focusing lens 40 is provided on the optic axis to form an image of target or symbol onto the imager 38. A relatively narrow pass filter 142 (or filter group), with steep optical cutoffs, is provided along the optic axis in advance of the imager 38. Here, the filter 142 is selected so that its pass or transmission characteristics are appropriate to the luminescent inks or dyes used in the optical symbols or targets. The filter or filter group 142 blocks all or nearly all the illumination at the stimulating wavelength, so as to eliminate the light directly reflected from the target, but admits or passes the light at the fluorescence wavelength that is emitted by the target. Favorably, the filter or filter group 142 passes only a narrow band including the fluorescence wavelengths, so that ambient wavelengths will be largely excluded, and the hand held device can be used in normal indoor ambient lighting conditions, e.g., within a warehouse or pharmacy, even though the scanner is not provided with a nosepiece or optical shroud like that of the first embodiment.

Also shown in FIG. 5, the scanner 20' may have a cover or face plate 60, which may be clear, or which may be amber to limit some of the ambient light wavelengths not of interest. Optional filter or filters 62 may be employed in line with the LEDs 34. These optional filters pass illumination at the lower, stimulating wavelengths but block the higher wavelengths, i.e., the luminescence wavelengths, which otherwise would reflect back from the target.

Figure 6:
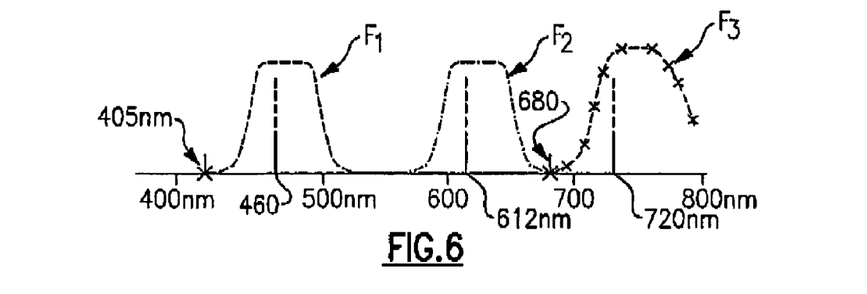
FIG. 6 is a graph of transmissivity of examples of optical filters that may be employed in embodiments of the invention.

FIG. 6 is a chart showing optical transmission characteristics of three different filters F1, F2, and F3, each within the visible spectrum between about 400 nm and 800 nm. Each of these filters corresponds to the fluorescence characteristics of a particular dye or ink that could be used.

In a first example, the ink that is used responds to shorter wavelengths, i.e., deep blue, and fluoresces when stimulated by incident light at a wavelength of about 405 nm, emitting light between about 420 to 560 nm, with a peak at 460 nm. Here, the chart of FIG. 6 shows a pass characteristic of filter F1 with a cutoff at about 420 nm and blocking substantially all the light below that wavelength. There may be an upper cutoff also, here shown at about 500 nm, which will filter out ambient (background) light.

In a second example, the dye or ink responds to incident light at 405 nm and produces luminescent light in a band centered at about 612 nm. For reading symbols printed in this ink, filter F2 is used as the filter 142, whose transmission characteristic is as illustrated in the center part of FIG. 6. The filter F2 has a lower cutoff between about 580 and 600 nm, and an upper cutoff at about 660 to 680 nm.

In a third example, an ink or dye is used which responds to longer wavelength stimulation light, i.e., at about 680 nm, which is in the orange region of the visual spectrum. This ink when excited by 680 nm light emits light at about 720 nm, which is in the red region. Here, the filter F3 is used, which has a lower cutoff between about 700 and 710 nm, and may have an upper cutoff at about 800 nm, i.e., at the edge of the near infrared zone. These may be interchangeable, e.g., by manipulating a dial or lever on the scanner 20'.

Many other luminescent inks and dyes exist and many more are expected to be produced in the future. For each, there is a first wavelength of light that the dye absorbs and stimulates the chemicals in the dye to luminesce at a second wavelength at which the luminescent or fluorescent light is emitted. For each particular dye or ink, a filter or filter group 142 may be selected that has a transmission characteristic that is appropriate for that ink or dye. The LEDs 34 and the drive circuitry on the board 32 are chosen to produce a strong enough light at the first wavelength. The filter 142 is selected to have a steep, sharp cutoff between the first and second wavelengths, and should have a fairly narrow pass band so that the scanner 20' produces a good read for luminescent symbols under normal ambient light conditions.

Figure 7:
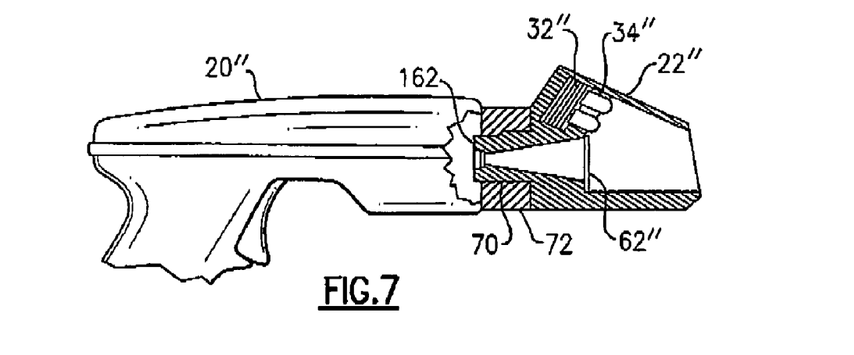
FIG. 7 is a side elevation of an embodiment including a removeable nosepiece.

A scanner 20" with an optional removable (i.e., interchangeable) modular nosepiece 22" or shroud according to an embodiment of this invention is shown in side elevation in FIG. 7. Here the LEDs 34" are arrayed within the shroud and this array is mounted above the optic axis of the scanner. A drive circuit module 32" for the LEDs" also situated within the nosepiece or shroud 22". Wiring (not shown) connects this module 32" to a suitable supply located within the scanner. An optical filter 62" is positioned on the return path along the optic axis within the shroud 22" to block the wavelengths emitted by the LEDs and admit light that is emitted by the target or symbol. An additional filter 162 may be located at a suitable location along the optical axis. This filter 162 is optional and is intended to be interchangeable to permit the nosepiece to be adapted to the particular fluorescent inks being employed. In this embodiment, the filter 62" is also interchangeable.

Here, the nosepiece 22" has a male plug member 70 that fits into a corresponding female socket or receptacle 72 on the face of the scanner 20". In this embodiment the second filter 162 is located in the male plug member, but this filter, if employed, could be located elsewhere.

While the invention has been described with respect to some preferred embodiments, it should be understood that the invention is not limited to those specific embodiments. Rather, many modifications and variation would present themselves to persons skilled in this art without departing from the scope and spirit of this invention, as defined in the appended claims.

We claim:

1. An optical symbol scanner assembly for detecting and decoding a symbol lying on a surface of an article, the symbol comprising a pattern of fluorescent markings on a non-fluorescent surface, said fluorescent markings fluorescing at a second wavelength when stimulated by radiation at a first wavelength, the assembly comprising:
    a hand-held, compact, fixed mounted or mobile scanner device having a distal face on which is positioned light-generating means for producing illumination at said first wavelength to fall on said symbol, said first wavelength being in the visible spectrum, said light-generating means including at least one light emitting diode that emits light at said first wavelength, and focusing means for focusing an image of said symbol on an imager device positioned proximally thereof within said scanner device, said focusing means defining an optic axis;
    an optical filter in line with said focusing means for admitting illumination at said second wavelength and blocking illumination at said first wavelength; and
    a shroud mounted on the distal face of said scanner device, with an optical passageway having an optic axis aligned with the optic axis of said scanning device, and an illumination channel within the shroud for directing and guiding the light emitted by said diode, wherein said shroud is in the form of a hollow nosepiece having a open, wide proximal end fitting onto the distal face of said hand-held scanner device and a narrow distal end that is transparent to said radiation at said first and second wavelengths, and a tapered opaque shell that narrows in the direction towards the distal end, such that said radiation at said first wavelength impinges on said symbol and the scanner device views the symbol as radiation at said second wavelength as produced by said fluorescent markings.

2. An optical symbol scanner assembly according to claim 1 wherein said shroud includes at the distal end thereof a flat plate of a transparent material traversing across the optic axis as defined by said focusing device.

3. An optical symbol scanner assembly according to claim 2 wherein said plate of material is oriented at a non-right angle to said optic axis such that the light impinging on said plate is not reflected directly back to said imager device.

4. An optical symbol scanner assembly according to claim 1 wherein the shell of said shroud is formed solid material.

5. An optical symbol scanner assembly according to claim 4, wherein said solid material is a plastic which is provided with an opaque coating.

6. An optical symbol scanner assembly according to claim 1 wherein said light-generating means includes a plurality of LEDs that produce illumination within the visible spectrum with said first wavelength being in the visible spectrum.

7. An optical symbol scanner assembly according to claim 6 wherein said first wavelength is a region of green to orange.

8. An optical symbol scanner assembly according to claim 7 wherein said second wavelength is in a region of orange to red.

9. An optical symbol scanner assembly according to claim 1 wherein said light generating means further includes an electric drive circuit that provides a forward voltage of substantially 3.6 volts to each of said at least one LED.

10. An optical symbol scanner assembly according to claim 1, further comprising a second transmission optical filter positioned in line with said at least one light emitting diode to transmit light at said first wavelength and block the illumination at said second wavelength from reaching said symbol.

11. An optical symbol scanner assembly for detecting and decoding a symbol lying on a surface of an article, the symbol comprising a pattern of fluorescent markings on a non-fluorescent surface, said fluorescent markings fluorescing at a second wavelength in the visible spectrum when stimulated by radiation at a first wavelength within the visible spectrum above 400 nm, the assembly comprising:
    a band-held scanner device having a distal face on which is positioned light-generating means for producing illumination at said first wavelength to fall on said symbol, said light generating means including at least one light emitting diode that emits light at said first wavelength, and focusing means for focusing an image of said symbol on an imager device positioned proximally thereof within said scanner device, said focusing means defining an optic axis; and
    a field-interchangeable optical filter in line with said focusing means for admitting illumination at said second wavelength and blocking illumination at said first wavelength.

12. An optical symbol scanner assembly according to claim 11 further comprising a second optical transmission filter positioned in line with said at least one light emitting diode to transmit light at said first wavelength and block the illumination at said second wavelength from reaching said symbol.

13. An optical symbol scanner assembly according to claim 11 wherein said first wavelength is about 680 nm and said second wavelength is about 720 nm.

14. An optical symbol scanner assembly according to claim 11 wherein said first wavelength is in the blue to blue-violet range at substantially 405 nm and said second wavelength is in the blue to blue-green range between 420 and 560 nm.

15. An optical symbol scanner assembly according to claim 11 wherein said first optical filter is a narrow pass filter that passes only radiation centered on said second wavelength, and blocks other radiation so that the imager device is shielded from ambient radiation.

16. An optical symbol scanner according to claim 11 wherein said interchangeable optical filter is in the form of a male plug member that fits into a corresponding female socket or receptacle on the distal face of the scanner, such that the scanner may be adapted to particular fluorescent markings to be scanned.

17. A method of scanning and reading an optical symbol printed with a luminescent material that when illuminated with light at a first wavelength longer than the wavelengths of the ultraviolet spectrum is stimulated to emit light at a second wavelength, with the first wavelength and second wavelength both being in the visible spectrum, said optical symbol representing a quantum of information; and employing a hand held scanner device that produces illumination by energizing one or more light emitting diodes that produce light at said first wavelength; and which pick up the image produced at said second wavelength using a focusing lens system to focus said image on an imager device positioned proximally of said focusing lens system; comprising the steps of a. energizing said one or more light emitting diodes to produce the light at said first wavelength in the visible spectrum;

b. filtering illumination of the image viewed through said focusing lens system to filter out light at said first wavelength and pass light at said second wavelength;

c. the imager producing a signal representing the image of said optical symbol; and d. decoding said signal to produce the information represented by said optical symbol.

18. The method according to claim 17 wherein said first wavelength is substantially in the orange region and said second wavelength is in the red to infrared region.

19. The method according to claim 17 wherein said first wavelength is substantially 680 nm and said second wavelength is between 700 nm and 800 nm.

* * * * *

UNITED STATES PATENT AND TRADEMARK OFFICE
CERTIFICATE OF CORRECTION

PATENT NO. : 7,357,326 B2  Page 1 of 1
APPLICATION NO. : 11/290762
DATED : April 15, 2008
INVENTOR(S) : John R. Hattersley et al.

It is certified that error appears in the above-identified patent and that said Letters Patent is hereby corrected as shown below:

Col. 10, Claim 11, line 53:   "band-held" should read --hand-held--

Signed and Sealed this

Fifth Day of August, 2008

JON W. DUDAS
*Director of the United States Patent and Trademark Office*